(12) United States Patent
Ishikawa et al.

(10) Patent No.: US 11,041,575 B2
(45) Date of Patent: Jun. 22, 2021

(54) MAGNETICALLY LATCHED PNEUMATIC VALVE

(71) Applicant: TRINITY INDUSTRIAL CORPORATION, Aichi (JP)

(72) Inventors: Katsuhiro Ishikawa, Aichi (JP); Naohiro Osawa, Aichi (JP)

(73) Assignee: TRINITY INDUSTRIAL CORPORATION, Aichi (JP)

( * ) Notice: Subject to any disclaimer, the term of this patent is extended or adjusted under 35 U.S.C. 154(b) by 20 days.

(21) Appl. No.: 16/426,007

(22) Filed: May 30, 2019

(65) Prior Publication Data

US 2020/0378523 A1    Dec. 3, 2020

(51) Int. Cl.
*F16K 31/122* (2006.01)
*F16K 31/08* (2006.01)

(52) U.S. Cl.
CPC ........ *F16K 31/1221* (2013.01); *F16K 31/084* (2013.01)

(58) Field of Classification Search
None
See application file for complete search history.

(56) References Cited

U.S. PATENT DOCUMENTS 3,376,013 A * 4/1968 Mallett ............... F16K 21/04
                                                  251/38
2018/0328513 A1* 11/2018 Emory ............... A01G 25/167

FOREIGN PATENT DOCUMENTS

JP       5511339        6/2014
JP    2017-002939      1/2017

* cited by examiner

*Primary Examiner* — Daphne M Barry
(74) *Attorney, Agent, or Firm* — Clark & Brody LP

(57) ABSTRACT

A valve device that can be activated by pilot air of comparatively low pressure though the size of such valve device is small and provides a valve device that is excellent in durability. The valve device comprises a pilot port which pilot air is supplied to activate a piston part, and a biasing means to press the piston part in the opposite direction to supply and discharge the pilot air, thus controlling the opening and closing of the valve. A first magnetic member is provided on a valve rod; a second magnetic member is provided on a housing. Magnetic attraction is generated between both magnetic members to activate the piston part in the first direction, thus increasing such magnetic attraction by the approach of both magnetic members. An arrangement-relation facing each magnetic member through an air gap is set even when making its closest approach.

12 Claims, 7 Drawing Sheets

# MAGNETICALLY LATCHED PNEUMATIC VALVE

TECHNICAL FIELD

This invention relates to a valve device, especially to a valve device as a color-change valve to supply each selected color paint that is being transported from a color-paint source to a coating machine or the like.

TECHNICAL BACKGROUND

Demand for vehicle-color variation from users has recently diversified, and it is now necessary to coat many different colors onto the same model of car. Especially, recent car bodies that need to be coated with different colors are mixed and carried onto a car-coating line. Thus, it is needed to coat such a car body by changing the color coating in accordance with the body type.

As shown in FIG. 12, the color-change device 101 is used, for example, to change a color coating. Conventionally, the general type of color-change device 101 has a structure of which multiple color-change valves 104 and a cleaning-liquid valve 105 and a cleaning-air valve 106 or the like are provided on a manifold block 103, therein a color-paint passage 102 is formed. These multiple color-change valves 104 are connected respectively to each color paint source P1 to P4. The cleaning-liquid valve 105 is connected to the cleaning-liquid source 107, and the cleaning-air valve 106 is connected to the pressed-air source 108. Using such a color-change device 101 allows the color-change device 101 to select any color paint from among many color paints, which makes it possible to supply such a selected paint to the coating machine 109, thus aiding in coating the car body.

FIG. 13 shows an example of the conventional type of valve device wherein the color-change valve 104 is used for this type of color-change device. This color-change valve 104 is a pilot-type 2-port valve that has the driving means of a piston cylinder made of the valve-driving part 112 located atop of the drawing, and the valve-main body 113 located at the bottom of the drawing.

The piston housing 121 making the valve-driving part 112 has a piston-housing space 122 inside and a rod-insertion hole 123 passing through the piston-housing space 122 at the bottom. The valve housing 131 is provided at the bottom-end face of the piston housing 121. The input port 132 is formed on the side of the valve housing 131, and the output port 133 is formed at the bottom face. These ports 132, 133 are communicated with the passage 134 provided within the valve housing 131. The valve seat 135 is formed within the opening of the output port 133. A support assembly 138, including the packing 136, 137 or the like, is installed in the valve housing 131.

This color-change valve 104 has a valve rod 141 as a mobile body 141 having a rod part 142, a piston part 143 and a valve part 144. The piston part 143 is secured on the base end of the rod part 142 and is also slidably stored within the piston housing space 122. The tip of the rod part 142 protrudes out of the piston-housing space 122 through the rod-insertion hole 123 and the support assembly 138. Then, such protrusion reaches the vicinity of the valve seat 135 of the valve housing 131. The valve part 144 is integrally formed at the tip of the rod part 142 and can be contacted to and separated from the valve seat 135.

The piston-housing space 122 within the piston housing 121 is divided by the piston part 143 into the first chamber 151 and second chamber 152. The pilot port 153 is formed in the first chamber 151 of the piston housing 121, which drives the piston part 143 upward to supply the pilot air. A biasing means 154 is stored in the second chamber 152 of the piston housing 121, which presses the piston part 143 downward all the time. Such a mechanism of the color-change valve 104 makes it possible to drive the valve rod 141 vertically by the supply and discharge of the pilot air, with the valve part 144 being contacted or separated from the valve seat 135, subsequently controlling the opening and closing of the valve.

Besides this type of valve device, the valve as shown in Patent Document 1, for example, is conventionally suggested.

PRIOR ARTS

Patent Documents

Patent Document 1: Japanese Patent No. 5511339
Patent Document 2: Unexamined Japanese Patent Application No. 2017-2939

SUMMARY OF THE INVENTION

Problems to Be Solved By the Invention

The above conventional valve device is installed into a driving part such as the arm of the coating machine or the like. Therefore, such a valve device is required to be as small as possible. However, if the valve device is downsized, the diameter of the piston should be smaller, thus decreasing the pressurized area of the piston part. To activate the piston part under a similar power, as usual, it is necessary to increase the pressure of the pilot air (e.g. 0.4 MPa should be increased up to 0.8 MPa). Therefore, the compressed pressure to supply the air should be increased.

Under such circumstance, a valve device is conventionally suggested such that the piston-drive force based on the pilot air should be supported by magnetic force (e.g. see Patent Document 2). However, the conventional device has a complicated structure and may make noise, because the magnet stored within the housing directly contacts a partition wall, and there is also the concern about low durability, since the magnet is made of parts that are not so strong against an impact or the like, thus being liable to damage.

This invention was made in the light of the above-mentioned problems. The aim of the invention is to provide a durable valve device to be activated by pilot air that is of comparatively light pressure regardless of it being small in size.

Means for Solving the Problems

To solve the above problems, the first aspect of this invention refers to a valve device comprising a housing having a piston-storing space; a valve rod of which a piston part is provided at the position within the piston-storing space and a valve part is formed at the tip protruding outside the piston-storing space; a pilot port that is provided on the first chamber of the first and second chambers that are dividedly formed on the piston part within the housing, so as to supply pilot air, thus activating the piston part in the first direction, along the axial line of the valve rod; and a biasing means, which is provided on the second chamber of the housing, to bias the piston part in the second direction that is the opposite direction of the first direction, so that valve part makes contact with or separates from the valve seat by supplying or discharging the pilot air, thus controlling the opening and closing of the valve, characterized in that the valve comprises a first-magnetic member provided on the valve-rod side and a second-magnetic member facing the first magnetic member provided on the housing side, therein at least one magnetic member, either of the first or second magnetic member is a permanent magnet, so that a magnetic attraction is generated between both magnetic members to activate the piston part in the first direction, thus increasing the magnetic attraction by the approach of both magnetic members, therein an arrangement-relation facing each magnetic member through an air gap is set even when making its closest approach.

Therefore, the first aspect of this invention generates the effect between both magnetic members to activate the piston part in the first direction and to increase the magnetic attraction by the mutual approach of both magnetic members. As such, the valve rod is activated in the first direction by the effect of the magnetic attraction as well as by the pressure of the pilot air while the pilot air is being supplied. Therefore, even if the pressurized area of the piston part is small, the opening and closing of the valve can be controlled by the comparatively low pressured pilot air. The arrangement relation of which both magnetic members face each other through an air gap is set between both magnetic members even as they approach each other the closest, so that the contact of both magnetic members can be avoided when activating the valve rod, and that the contact of the magnetic member with the inner wall of the housing can also be avoided, which may decrease noise or damage by the contact of the magnetic members, thus increasing the durability of the magnetic members.

The second aspect of this invention refers to a valve device according to the first aspect of this invention, characterized in that the magnetic attraction that works on the piston part while the pilot air is not being supplied is less than the biasing force of the bias means, and that the total amount of the pressing force of the magnetic attraction and of the pilot air that work on the piston part while the pilot air is being supplied is greater than the biasing force of the bias means.

The third aspect of this invention refers to a valve device according to the first aspect or the second aspect, characterized in that the first magnetic member and the second magnetic member are both permanent magnets, and that the proximity-fixing member, to hold firmly the first permanent magnet as the first magnetic member, is provided on the valve rod side in a state being close to the second permanent magnet as the second magnetic member.

As such, the third aspect of this invention allows the first permanent magnet to come close to the second permanent magnet, thus efficiently utilizing the magnetic attraction of both permanent magnets.

The fourth aspect of this invention refers to a valve device according to the first aspect or the second aspect, characterized in that the first magnetic member and the second magnetic member are both permanent magnets, and that the proximity-fixing member, to hold firmly the second permanent magnet as the second magnetic member, is provided on the housing side in a state being close to the first permanent magnet as the first magnetic member.

As such, the fourth aspect of this invention allows the second permanent magnet to come close to the first permanent magnet, thus efficiently utilizing the magnetic attraction of both permanent magnets.

The fifth aspect of this invention refers to a valve device according to the first aspect or the second aspect of this invention, characterized in that the first permanent magnetic member and the second permanent magnetic member are both permanent magnets, and that the piston part has a place where the first permanent magnet as the first magnetic member does not exist, and a stopper-step is provided within the housing side to avoid a collision of both permanent magnets in making contact at the place where the first permanent magnet does not exist.

As such, the fifth aspect of this invention allows the said place to first contact the stopper-step to avoid contacting or the like of both permanent magnets, thus reducing the possibility of noise and damage.

The sixth aspect of this invention refers to a valve device according to the first aspect or the second aspect of this invention, characterized in that the first permanent magnetic member and the second permanent magnetic member are both permanent magnets, and that the housing has a place where the second permanent magnet as the second magnetic member does not exist, and a stopper member is provided on the valve rod within the housing to avoid the collision of both permanent magnets in making contact at the place where the second permanent magnet does not exist.

As such, the sixth aspect of this invention allows the said place to first contact the stopper member to avoid contacting or the like of both permanent magnets, thus reducing the possibility of noise and damage.

Effects of the Invention

As described above, the first to sixth aspects of this invention make it possible to activate the valve device with pilot air of comparatively low pressure, even though the valve device is small, thus providing a valve device that is excellent in durability.

MODES FOR CARRYING OUT THE INVENTION

First Embodiment

Figure 1A:
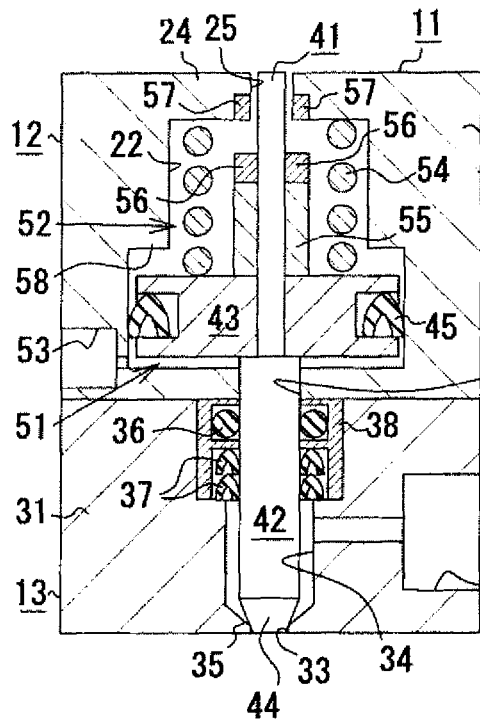
FIGS. 1(a) and 1(b) show the schematic drawings of the valve device as the first embodiment of this invention, showing the longitudinal section of such a valve device.
Figure 1B:
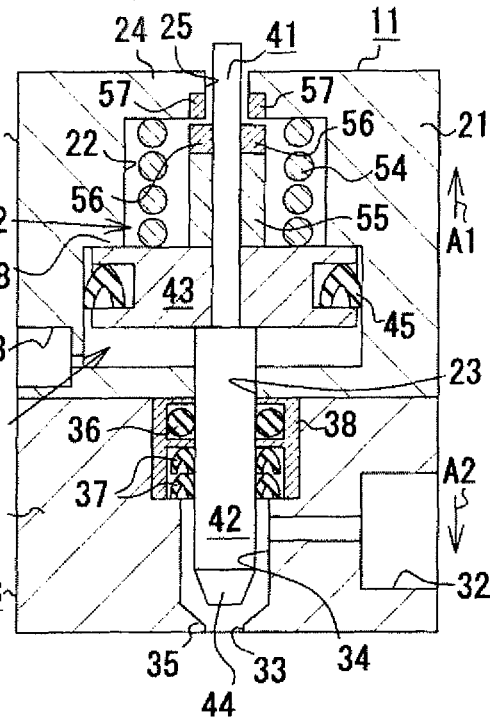
Figure 2:
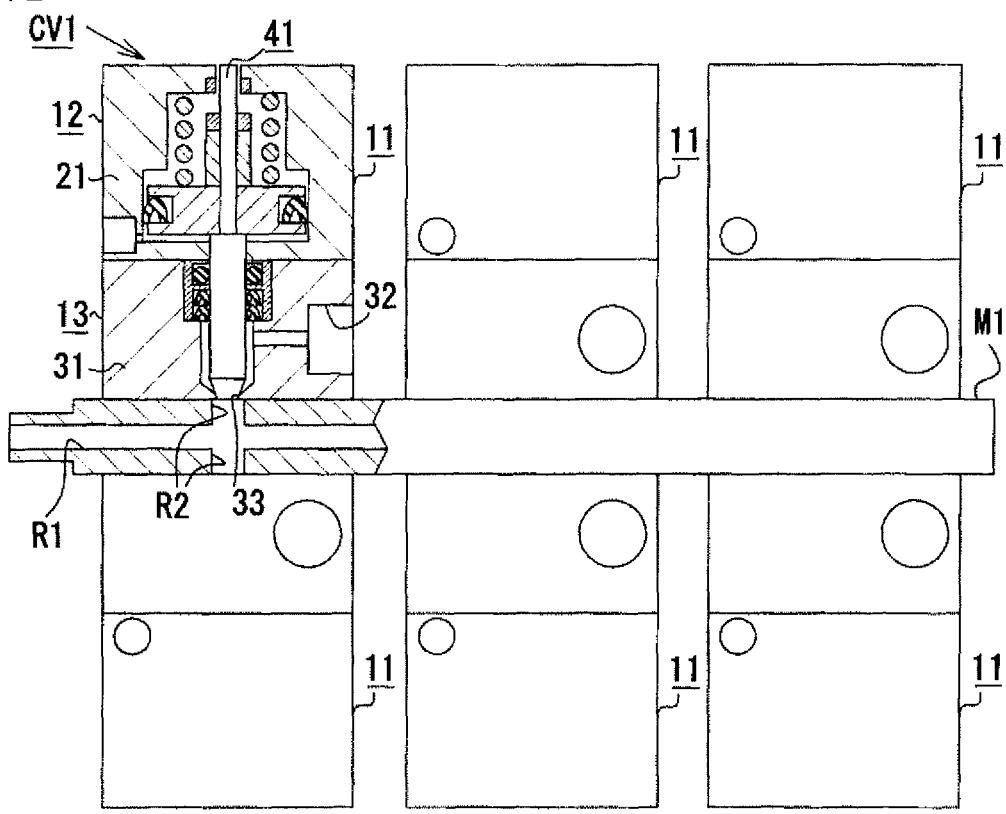
FIG. 2 is the schematic drawing of the valve device as the first embodiment being used.

Hereinafter the color-change valve 11 as an embodiment of the invention is described in reference to FIG. 1 and FIG. 2. Drawings (a) and (b) of FIG. 1 show the schematic longitudinal sectional view of the color-change valve 11. FIG. 2 shows the schematic view when the color-change valve 11 is being used as part of the color-change device CV1.

As shown in FIG. 1, the color-change valve 11 as an embodiment of this invention is a pilot type of a 2-port valve having a piston cylinder as a drive means, making of the valve-driving part 12 located atop the drawing and the valve-main body 13 located at the bottom of the drawing.

The piston housing 21 that forms the valve-driving part 12 has a piston-housing space 22 inside. A rod-insertion hole 23 is provided in the center of the lower part of the piston-housing space 21 that communicates the piston-housing space 22. A valve housing 31 is provided on the lower-end part of the piston housing 21. An input port 32 is formed on the side of the valve housing 31, and an output port 33 is formed in the center of the lower part. Also, a passage 34 to let the paint flow within the valve housing 31 and the input port 32 and the output port 33 are respectively communicated to the passage 34. A valve seat 35 that is sectionally tapered is formed inside the opening of the output port 33. Furthermore, within the valve housing 31, a cylindrical support assembly 38 including a sealing material 36, 37 or the like is arranged in an area (communication space) that connects the passage 34 to the rod insertion hole 23 of the piston housing 21. Therein, the sealing material 36 prevents the pilot air from leaking into the passage 34 from the piston-housing space 22 through the communication space. The sealing material 37 prevents the paint, the cleaning liquid or the like that is being led to the passage 34 from leaking to the piston-housing space 22 through the communication space.

The color-change valve 11 comprises a valve rod 41 as a mobile body having a rod part 42, a piston part 43 and a valve part 44. The valve rod 41 is slidably inserted into the rod-insertion hole 23. The rod part 42 of the embodiment of this invention is made of a bottom-half part that is relatively large in diameter and of an upper-half part that is relatively small in diameter. The disk-shaped piston part 43 is firmly attached to the small-diameter part of the rod part 42, i.e. at the position within the piston-housing space 22. The piston part 43 is placed within the piston-housing space 22, allowing the piston part 43 to slide vertically. A recess part for the housing packing is provided on the outer-peripheral surface of the piston part 43. Therein, a ring-seal packing 45 is placed.

The bottom end (head end) of the rod part 42 protrudes into the outer area of the piston housing space 22 through the rod-insertion hole 23. The bottom end (head end) of the rod part 42 goes through the center hole of the support assembly 38 to be exposed in the passage 34 within the valve housing 31. The valve part 44, having a tapered section, is integrally formed on the head end of the rod part 42, thus making contact with or separating from the valve seat 35 with the vertical motion of the valve rod 41. In addition, FIG. 1(a) shows the valve part 44 making contact with the valve seat 35, and FIG. 1(b) shows the valve part 44 separating from the valve seat 35.

The piston-housing space 22 within the piston housing 21 is divided into the first chamber 51 of the lower side and the second chamber 52 of the upper side through the piston part 43. The pilot port 53 is formed in the first chamber 51 of the piston housing 21 so that the pilot air is supplied therein so as to move vertically the piston part 43. The pilot port 53 opens on the side of the piston housing 21, thus communicating the first chamber 51 with the atmospheric pressure region.

The second chamber 52 of the piston housing 21 is communicated with the atmospheric-pressure region through a rod-release hole 25 provided in the center of the ceiling part 24. The upper end of the small diameter of the rod part 42 is always inserted into the rod-release hole 25 without making contact. A coil spring 54 in a compressed state as the bias means is stored in the second chamber 52. One end of the coil spring 54 makes contact with the upper end if the piston part 43 and the other end of the coil spring 54 makes contact with the inner wall of the ceiling part 24 within the piston housing 21, thus allowing the effect of the bias force always to press the piston part 43 downward.

Hereinafter, the mechanical structure to support the piston-driving force based on pilot air using magnetic force is described. The color-change valve 11 of the embodiment of this invention comprises a first permanent magnet 56 as the first magnetic member and a second permanent magnet 57 as the second magnetic member within its valve-driving part 12.

The second permanent magnet 57 is ring shaped and installed in a mounting recess formed on the inner-end opening of the rod-release hole 25 of the ceiling part 24. On the other hand, the first permanent magnet 56 is also a ring-shaped magnet and has the size to be engaged with the small diameter of the rod part 42. This first permanent magnet 56 is formed slightly smaller than the diameter of the coil spring 54, so as to be arranged in a state not being contacted with the coil spring 54 within the inner region of the coil spring 54. The second permanent magnet 57 is also formed almost the same size as the first permanent magnet 56. It is possible to use a conventional permanent magnet for the first permanent magnet 56 and for the second permanent magnet 57. However, a strong neodymium magnet of strong magnetic force is used for the embodiment of this invention. It is also possible to use, e.g. samarium cobalt magnets, ferrite magnets, alnico magnets or the like.

A cylindrically shaped sleeve 55 (proximity-fixing member) is mounted in the position of the base-end side rather than that of the piston part 43 on the smaller diameter part of the rod part 42. This sleeve 55 is of a non-magnetic material (made of non-magnetic metal e.g. synthetic resin, aluminum) and is of a predetermined length. Thereof, one end contacts the center of the upper surface of the piston part 43, and the first permanent magnet 56 is fixed on the other end by adhesion or the like. As such, compared to the condition that the first permanent magnet 56 is directly attached onto the top surface of the piston part 43, the first permanent magnet 56 approaching the second permanent magnet is firmly fixed in a state of both magnets facing each other.

Between the first permanent magnet 56 and the second permanent magnet 57, there is an arrangement relation of the magnetic force to drive the piston part 43 in the upper direction A1 (first direction) as shown in FIG. 1, i.e. an arrangement relation whereby the magnetic attraction works. Thus, the first permanent magnet 56 and the second permanent magnet 57 are facing each other with different electrodes. In this case, the magnetic attraction increases as the first permanent magnet 56 and the second permanent magnet 57 approach each other, thus maximizing the magnetic attraction in the state of the closest approach of both magnets, as shown in FIG. 1(b).

The stopper-step 58 is provided on the inner-wall surface of the side wall of the second chamber 52 within the piston housing 21, thus avoiding a collision of the first permanent magnet 56 and the second permanent magnet 57. This stopper-step 58 makes contact at the place of the piston part 43 where the first permanent magnet 56 does not exist, specifically at the place of the outer-peripheral part of the upper-end surface of the piston part 43. As a result of such contact, the upward movement of the piston part 43 is controlled (see FIG. 1(b)). As shown in FIG. 1(b), when the first permanent magnet 56 approaches closest to the second permanent magnet 57, an arrangement relation whereby the first permanent magnet 56 stops in a state with a slight air gap (e.g. 1 to 5 mm) before the second permanent magnet 57 is set between them (magnets 56 and 57). Specifically, such an arrangement relation as described above is set by adjusting the length of the sleeve 55 at the most appropriate value.

Hence, the inner state of the first chamber 15 and of the second chamber 52 become an atmospheric-pressure region, respectively, when the pilot air is not being supplied, as shown in FIG. 1(a). At this time, the pressurizing force by the atmospheric pressure working the first direction A1 and the second direction A2 through the piston part 43 is offset. Then, the biasing force of the coil spring 54 that presses the piston part 43 into the second direction A2 works on the piston part 43 at the same time that magnetic attraction is being generated to press the piston part 43 into the first direction A1. However, the value of the magnetic attraction at this time is the least as the first permanent magnet 56 and the second permanent magnet 57 are separated the farthest from each other. Furthermore, the magnetic attraction is set so as to be less than the biasing force of the coil spring 54, thus causing the piston part 43 to move in the second direction A2. As such, the valve rod 41 moves downward so that the valve part 44 contacts the valve seat 35 to become closed, thus forming the passage 34. In other words, in regard to the color-change valve 11 as the embodiment of this invention, the valve is completely closed by the biasing force of the coil spring 54 even when such coil spring 54 is blocking the pilot air.

As shown in FIG. 1(b), when the pilot air is being supplied, inside of the second chamber 52 there is still an atmospheric-pressure region. On the other hand, the pilot air being pressurized in the pilot port 53 is introduced into the first chamber 51. As such, the pressure of the pilot air works at the bottom side of the piston part 43 so that the force to press the piston part 43 is in the first direction A1. The total amount of the pressuring force by the pilot air and of the above magnetic attraction is set in advance so as to become greater than the biasing force of the coil spring 54. Thus, the pressurizing force by the pilot air and of the above magnetic attraction work at the same time. Then, the piston part 43 moves into the first direction A1 against the biasing force of the coil spring 54. Thus, the piston part 43 stops being in contact with the stopper-step part 58. As a result, the valve rod 41 moves upward so that the valve part 44 separates from the valve seat 35 to become closed, thus forming the passage 34.

The mechanical motion whereby the color-change valve 11 as the embodiment of this invention is used as part of the color-change device CV1 is described hereinafter. As shown in FIG. 2, the color-change valve 11 as the embodiment of this invention is used in a state, e.g. to be multiply provided in the manifold block M1. The main passage R1 as the paint-flow passage is formed within the manifold block M1. Besides, multiple sub-passages R2 are branched from there and formed. The main passage R1 is connected to a coating machine (not described in the drawings). Each color-change valve 11 is mounted such that the opening of each sub-passage R2 is communicated with each output port 33 in a state that the valve housing 31 contacts the manifold block M1. Also, an input port 32 of each color-change valve 11 is separately connected to an individual-paint supplying source (drawing omitted). The pilot port 53 of each color-change valve 11 is connected to an air compressor (drawing omitted) for supplying the pilot air through a fluid controller such as a solenoid valve or the like (drawing omitted). The embodiment of this invention is designed such that air of comparatively low pressure e.g. 0.4 MPa is supplied.

In the initial stage that the pilot air is not being supplied to each color-change valve 11, the passage 34 of each color-change valve 11 is closed. Thus, the paint is not being supplied then to the sub-passage R2 and to the main passage R1. At this time, if the pilot air is being supplied to the specified color-change valve 11, the valve rod 41 of the color-change valve 11 is driven to the position as shown in FIG. 1(b) from the position as shown in FIG. 1(a). As such, the valve part 44 is separated from the valve seat 35, thus forming an opening to communicate the input port 32 with the output port 33 through the passage 34. Then, the predetermined paint is flown into the manifold block M1 from the color-change valve 11, thus supplying the appropriate paint into the coating machine. Also, if the supply of pilot air into the color-change valve 11 is suspended, the valve rod 41 of the color-change valve 11 is returned to the position as shown in FIG. 1(a) from the position as shown in FIG. 1(b). As such, the valve part 44 is closed as being in contact with the valve seat 35, so as to shut off the relation between the input port 32 and the output port 33. Therefore, the predetermined paint will not be flown into the manifold block M1 from the color-change valve 11, thus suspending the paint being supplied to the coating machine.

Therefore, the embodiment of this invention realizes the following effects.

(1) The color-change valve 11 as the embodiment of this invention generates the magnetic attraction between the first permanent magnet 56 and the second permanent magnet 57, which is increased by the approach of each magnet when driving the piston part 43 in the first direction A1. As such, when the pilot air is being supplied, the magnetic attraction works with the pilot air, thus driving the valve rod 41 in the first direction A1. Therefore, even if the pressurized area of the piston part 43 is small, the closing and opening of the valve can be controlled by using the comparatively low pressured-pilot air. Also, an arrangement-relation facing the first permanent magnet 56 and the second permanent magnet 57 through an air gap is set between them when making its closest approach, so that the contact of both the first permanent magnet 56 and the second permanent magnet 57 can be avoided when activating the valve rod 41, and that the contact of the first permanent magnet 56 and the second permanent magnet 57 with the inner wall of the housing can also be avoided, which may decrease noise or damage by such contact of the permanent magnets, thus increasing the durability of the magnetic members. The aforementioned embodiment of this invention makes it possible to provide a color-change valve 11 that can be activated by pilot air of comparatively low pressure, even though such color-change valve is small and light, thus providing such a color-change valve 11 that is excellent in durability.

(2) In the case of this color-change valve 11 when the pilot air is not being supplied, the magnetic attraction that works on the piston part 43 is set so as to become less than the biasing force of the coil spring 54. Such a biasing force of the coil spring 54 makes the valve rad 41 move to the position whereat the valve part 44 contacts the valve seat 35, thus keeping the valve completely closed. Also, the total amount of the magnetic attraction that works on the piston part 43, and the total amount of the pressing force by the pilot air while the pilot air is being supplied, is set to be greater than the biasing force of the bias means. Therefore, the resultant force of the magnetic attraction and of the pressing force by the pilot air makes the valve rod 41 move to the position whereat the valve part 44 is separated from the valve seat 35, thus keeping the valve completely closed. Also, this embodiment provides a normal closed type of valve of which the valve is closed by the biasing force of the coil spring 54 when the pilot air is not being supplied. Therefore, it is possible to reduce the amount of the supply of the pilot air necessary to activate the color-change device CV1 that makes most units of the multiple color-change valves 11 closed.

(3) About this color-change valve 11, the first permanent magnet 56 is used as the first magnetic member, and the second permanent magnet 57 is used as the second magnetic member, which makes it possible to generate magnetic attraction greater than if either one of them is not a magnet. Also, the sleeve 55 is provided on the valve rod 55 to hold firmly the first permanent magnet 56 in the state of being close to the second permanent magnet 57, thus making it possible for the magnet attraction to be greater and more efficient.

About this color-change valve 11, the stopper-step 58 is provided on the piston housing 21 that makes contact with the outer-peripheral part of the upper-end surface whereat the first permanent magnet 56 does not exist on the piston part 43 within the piston housing 21. As such, when the valve rod 41 moves in the first direction A1, the stopper-step part first contacts the stopper-step 58 to avoid contact or the like of the first permanent magnet 56 with the second permanent magnet 57, thus reducing the possibility of noise and damage.

(5) About this color change valve 11, the first permanent magnet 56 is used as the first magnetic member, and the second permanent magnet 57 is used as the second magnetic member. On the other hand, non-magnetic members are used for other components (e.g. piston housing 21, valve housing 31, rod part 42, piston part 43, support assembly 38 or the like). Therefore, there is no magnetic force generated between such non-magnetic components; magnetic attraction is only generated between the first permanent magnet 56 and the second permanent magnet 57.

Second Embodiment

Figure 3A:
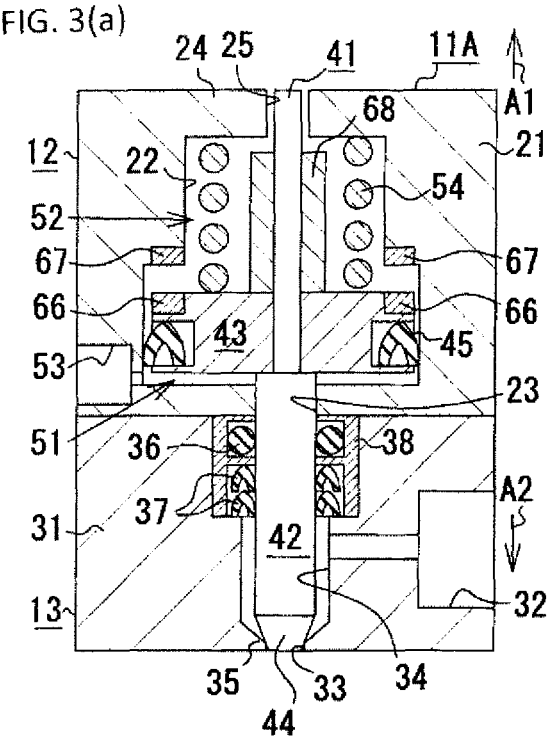
FIGS. 3(a) and 3(b) show the schematic drawings of the valve device as the second embodiment of this invention, showing the longitudinal sectional view of such a valve device.

Hereinafter, the color-change valve 11A as the second embodiment of this valve-device invention is described in reference to FIG. 3. FIGS. 3(a) and (b) are the schematic longitudinal sectional view of the color-change valve 11A. In this section of the second embodiment, only aspects different from the first embodiment are mainly described, and the description of the common aspects is omitted only by showing the same part numbers.

As shown in FIGS. 3(a) and (b), this color-change valve 11A comprises a first permanent magnet 66 as the first magnetic member and a second permanent magnet 67 as the second magnetic member within its valve-driving part 12. The first permanent magnet 66 and the second permanent magnet 67 are both ring-shaped magnets but different in size, and the mounting place is different from that of the first embodiment. The first permanent magnet 66 is almost of the same outer diameter as the piston part 43 and is attached to the mounting recess that is formed on the upper-peripheral part of the upper-end surface of the piston part 43. The second permanent magnet 67 is almost of the same outer diameter as the first permanent magnet 66. A mounting recess is formed on the stair-member located on the side-inner wall of the second chamber 52 within the piston housing 21 and the second permanent magnet 67 is attached to the mounting recess. Thus, the first permanent magnet 66 and the second permanent magnet 67 are facing each other with different electrodes.

Figure 3B:
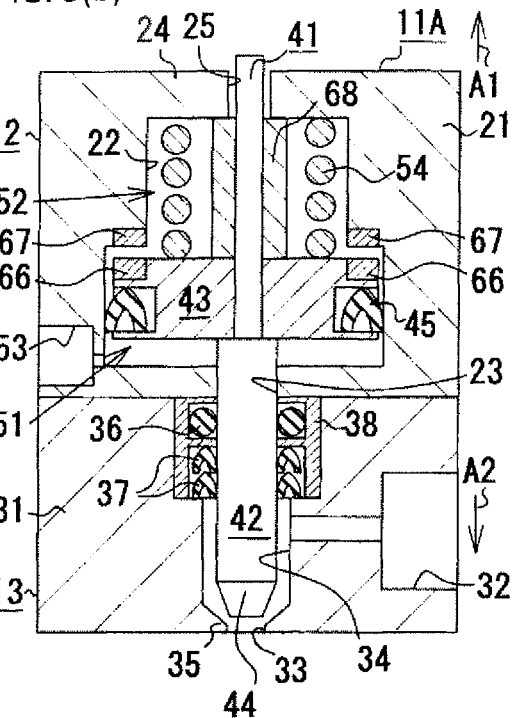

About this embodiment, a cylindrically shaped non-magnetic stopper member 68 is firmly mounted in the position of the base-end side rather than that of the piston part 43 on the smaller-diameter part of the cylindrical-rod part 42. This stopper member 68 makes contact with the place of the upper-end side whereat the first permanent magnet 66 does not exist within the piston housing 21. Specifically, it makes contact with the inner-wall surface of the ceiling part 24. As a result of such contact, the upward movement of the piston part 43 is controlled (see FIG. 3(b)). As shown in FIG. 3(b), when the first permanent magnet 66 approaches closest to the second permanent magnet 67, an arrangement relation whereby the first permanent magnet 66 stops in a state with a slight air gap (e.g. 1 to 5 mm) before the second permanent magnet 67, is set between the magnets 66 and 67.

Even the color-change valve 11A, as structured above, makes it possible to drive the valve rod 41 vertically by supplying and discharging the pilot air and to make contact with and to separate the valve part 44 from the valve seat 35, thus opening and closing the valve. The color-change valve 11A can also be activated by pilot air of comparatively low pressure, even though the size of such valve 11A is small, thus providing a valve device that is excellent in durability.

Third Embodiment

Figure 4A:
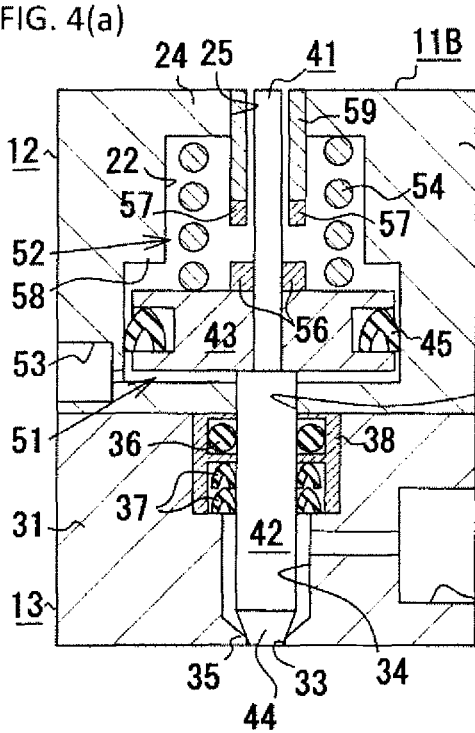
FIGS. 4(a) and 4(b) show the schematic drawings of the valve device as the third embodiment of this invention, showing the longitudinal sectional view of such a valve device.
Figure 4B:
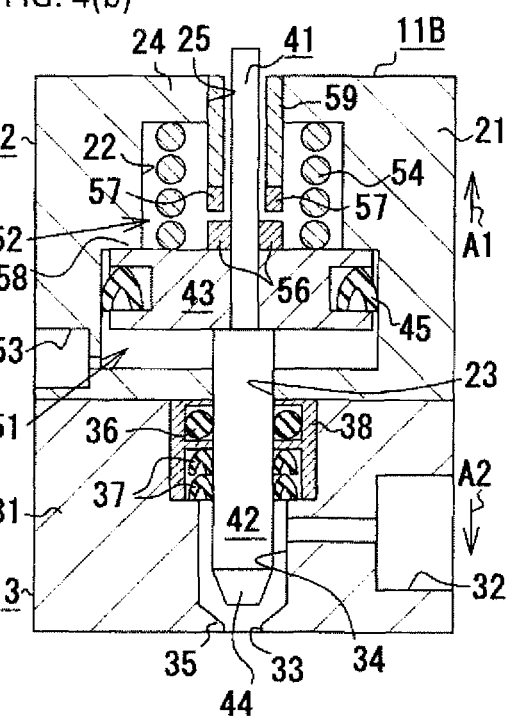

Hereinafter, the color-change valve 11B as the third embodiment of this valve-device invention is described in reference to FIG. 4. FIGS. 4(a) and (b) are the schematic longitudinal sectional views of the color-change valve 11B. In this section of the third embodiment, only aspects different from the first embodiment are mainly described, and the description of the common aspects is omitted only by showing the same part numbers.

As shown in FIGS. 4(a) and (b), this color-change valve 11B comprises the first permanent magnet 56 as the first magnetic member and the second permanent magnet 57 as the second magnetic member within its valve-driving part 12. The first permanent magnet 56 and the second permanent magnet 57 are both ring-shaped magnets but different in size, and the mounting place is different from that of the first embodiment. The first permanent magnet 56 is inserted into the small diameter part of the rod part 42 and is fixed so as to make contact with the center of the upper-end surface of the piston part 43. On the other hand, the second permanent magnet 57 is mounted in the piston housing 21 through the cylindrically shaped and non-magnetic sleeve 59 (proximity-fixing member). Specifically, this sleeve 59 is installed in the rod-release hole 25 of which one end is on the ceiling 24 and the other end extends in the direction of the piston part 43. And the second permanent magnet 57 is fixed on the end surface of the other end with an adhesive or the like. As a result, compared to the case that the second permanent magnet 57 is directly fixed on the ceiling part, the second permanent magnet 57 approaches to the first permanent magnet 56 to be firmly fixed in a state of both magnets facing each other. The first permanent magnet 56 and the second permanent magnet 57 are facing each other with different electrodes, thus generating the magnetic attraction between them. Also, the sleeve 59 and the second permanent magnet 57 have a hole in the middle that is larger in diameter than the outer diameter of the small-diameter part of the rod part 42, thus keeping the state of non-contact with the rod part 42.

Even the color-change valve 11B, as structured above, makes it possible to drive the valve rod 41 vertically by supplying and discharging the pilot air and to make contact to with and to separate the valve part 44 from the valve seat 35, thus opening and closing the valve. The color-change valve 11B can also be activated by pilot air of comparatively low pressure, even though the size of such valve 11B is small, thus providing a valve device that is excellent in durability.

Fourth Embodiment

Figure 5A:
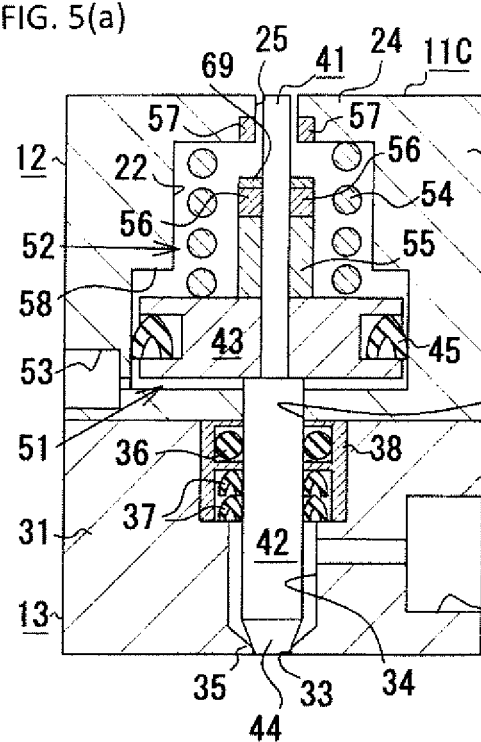
FIGS. 5(a) and 5(b) show the schematic drawings of the valve device as the fourth embodiment of this invention, showing the longitudinal sectional view of such a valve device.
Figure 5B:
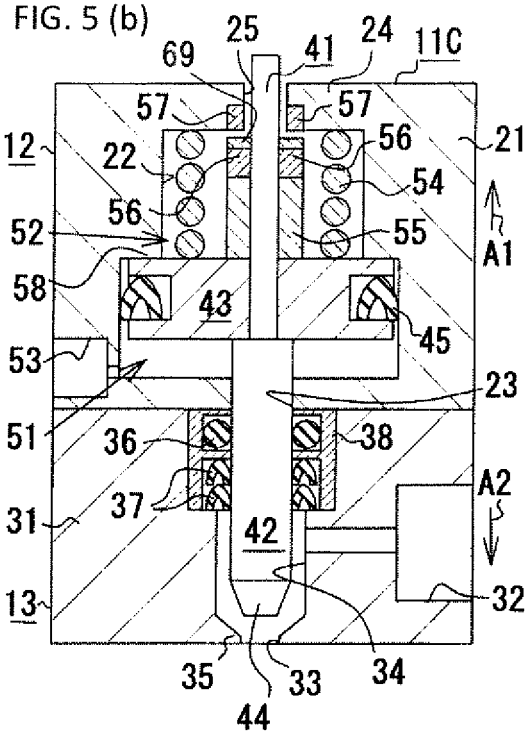

Hereinafter, the color-change valve 11C as the fourth embodiment of this valve-device invention is described in reference to FIG. 5. FIGS. 5(a) and (b) are the schematic longitudinal sectional views of the color-change valve 11C. In this section of the fourth embodiment, only aspects different from the first embodiment are mainly described, and the description of the common aspects is omitted only by showing the same part numbers.

As shown in FIGS. 5(a) and (b), about this color-change valve 11C, a cylindrically shaped sleeve 55 (proximity-fixing member) is mounted in the position of the base-end side rather than the piston part 43 on the small-diameter part of the rod part 42. The first permanent magnet 56 is arranged on the upper side of the sleeve 55. Furthermore, a fastening member such as a nut 69 or the like made of a non-magnetic material is arranged above the first permanent magnet 56. Fastening the nut 69 fixes the first permanent magnet 56 onto the sleeve 55. Even the color-change valve 11C, as structured above, makes it possible to drive the valve rod 41 vertically by supplying and discharging the pilot air and by making contact with and by separating the valve part 44 from the valve seat 35, thus opening and closing the valve. The color-change valve 11C can also be activated by pilot air of comparatively low pressure, even though the size of such valve 11C is small, thus providing a valve device that is excellent in durability.

Fifth Embodiment

Figure 6A:
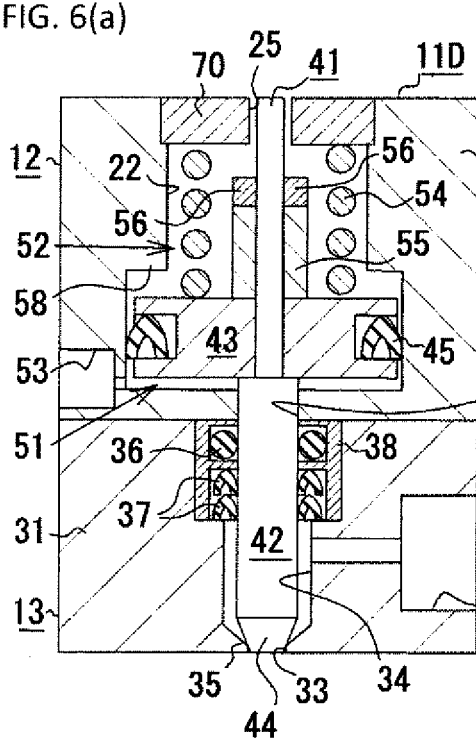
FIGS. 6(a) and 6(b) show the schematic drawings of the valve device as the fifth embodiment of this invention, showing the longitudinal sectional view of such a valve device.
Figure 6B:
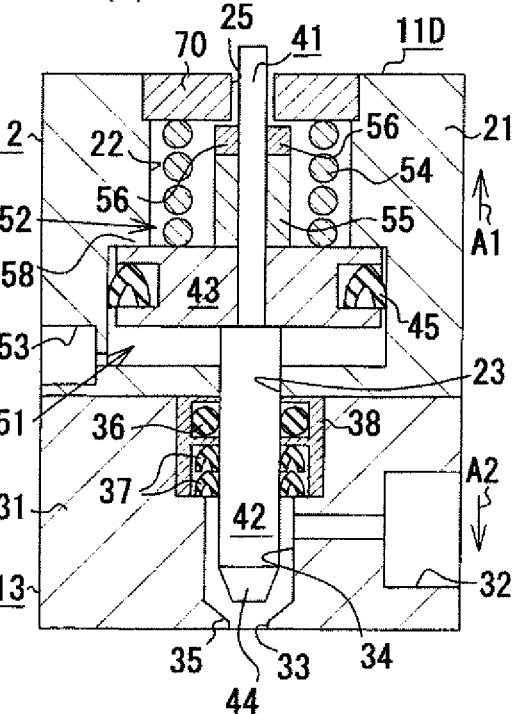

Hereinafter, the color-change valve 11D as the fifth embodiment of this valve device invention is described in reference to FIG. 6. FIGS. 6(a) and (b) are the schematic longitudinal sectional views of the color-change valve 11D. In this section of the fifth embodiment, only aspects different from the first embodiment are mainly described, and the description of the common aspects is omitted only by showing the same part numbers.

About this embodiment, other members except for the permanent magnets are used for the second magnetic member. As shown in FIGS. 6(a) and (b), a disk-shaped magnetic-lid member 70 is screwed into the place that is to be the ceiling part of the piston housing 21, thus letting such a lid member to work as the second magnetic member. In other words, the piston part 43 is pressured in the first direction A1 with the effect of the magnetic attraction that generates between the lid member 70 and the first permanent magnet 56. Such a lid member 70 is formed using an alloy or the like that is a magnetic body, such as an iron-based metal or stainless steel.

Sixth Embodiment

Figure 7:
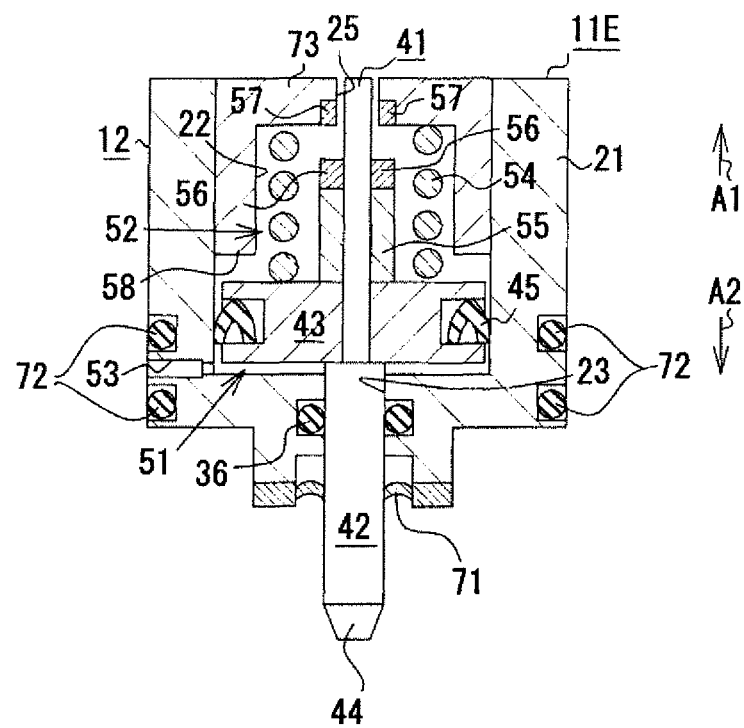
FIG. 7 is the schematic drawing of the valve device as the sixth embodiment of this invention, showing the longitudinal sectional view of such a valve device.
Figure 8:
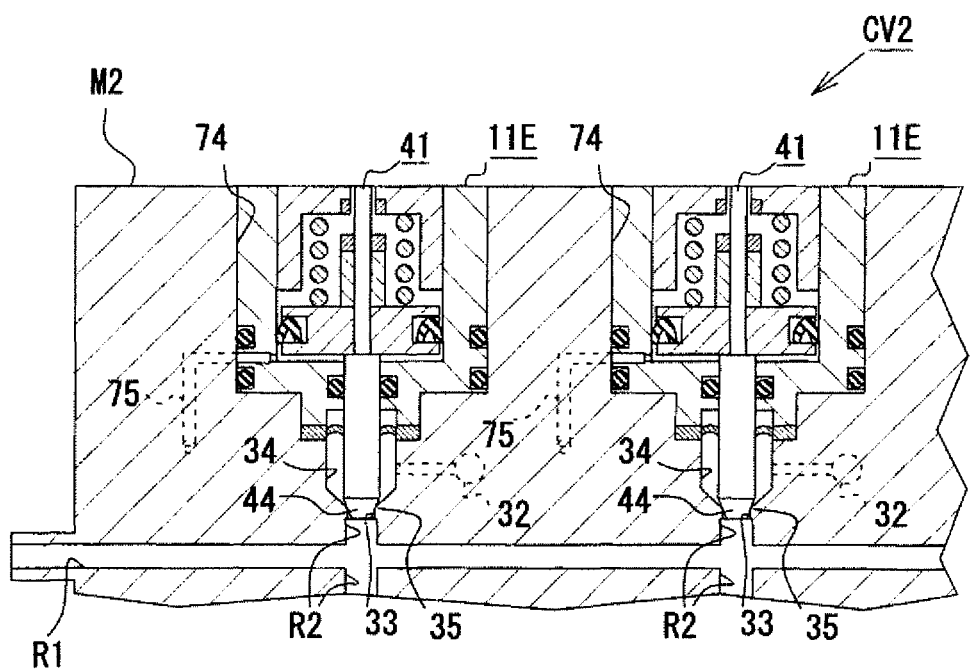
FIG. 8 is the schematic drawing of the valve device as the sixth embodiment being used.

Hereinafter, the color-change valve 11E as the fifth embodiment of this valve-device invention is described in reference to FIGS. 7 and 8. FIGS. 7(a) and (b) are the schematic longitudinal sectional views of the color-change valve 11E. FIG. 8 is a schematic view of the color-change valve 11E being used as part of the color-change device CV2. In this section of the sixth embodiment, only aspects different from the first embodiment are mainly described, and the description of the common aspects is omitted only by showing the same part numbers.

As shown in FIGS. 7(a) and (b), this color-change valve 11E comprises a valve-driving part 12. However, it does not comprise a valve housing 31 making the valve-main unit 13. Therefore, the tip of the valve rod 41 protrudes from the piston housing 21 and is exposed outside of the color-change valve 11E. About this color-change valve 11E, the diaphragm 71 as the separation member is provided in the insertion hole 23 that is open at the bottom face of the piston housing 21. The diaphragm 71 plays the role to in preventing paint, cleaning liquid or the like from flowing into the passage 34 through the communication space or from leaking into the piston-housing space 22. Also, an opening is formed on the top surface of the piston housing 21, and therein the U-shaped lid member 73 is cross-sectionally screwed, thus forming the piston housing space 22. A mounting recess is formed in the inner-end opening of the rod-release hole 25 of the lid member 73. Then the first permanent magnet 57 is installed in the mounting recess. A pair of packing-housing recesses is provided at the upper and lower position of the pilot port 53 within the lower side of the piston housing 21, thus installing the packing 72 individually in the packing-housing recess.

On the other hand, as shown in FIG. 8, the manifold block M2 of this embodiment functions as the valve housing. The multiple valve-mounting recesses 74 are formed in multiple places. The bottom-side region of each valve-mounting recess 74 is a passage 34 wherein the paint or the like flows. The input port 32 and the output 33 are formed in communication with this passage 34. The output port 33, located on the bottom-center part of each valve mounting recess 74, is connected to each sub-passage R2 provided on the manifold block M2, and the valve seat 35 is formed in its connection part. Also, multiple pilot-air inlets 75 are provided on the manifold block M2, and each pilot-air inlet 75 is open at the inner side of each valve mounting recess 74. Mounting the color-change valve 11E in each valve-mounting recess 74 achieves the color-change device CV2.

Even the color-change device CV2, as structured above, makes it possible to move the valve rod 41 vertically by supplying and discharging the pilot air in regard to the color-change valve 11E, so as to make the valve part 44 contact and separate from the valve seat 35 of the manifold block M2, thus controlling the opening and closing of the valve. The color-change valve 11E can also be activated by pilot air of comparatively low pressure, even though the size of such valve 11E is small, thus providing a valve device that is excellent in durability.

It is also possible to modify the embodiments of this invention as follows.

Figure 9A:
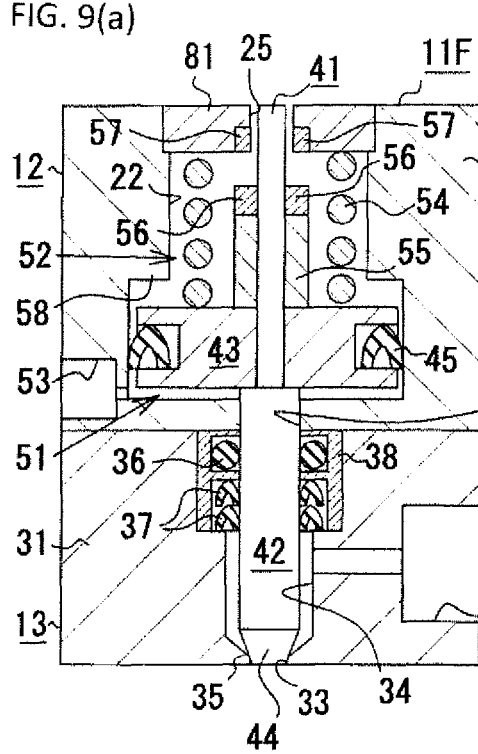
FIGS. 9(a) and 9(b) show the schematic drawings of the valve device as another embodiment of this invention.
Figure 9B:
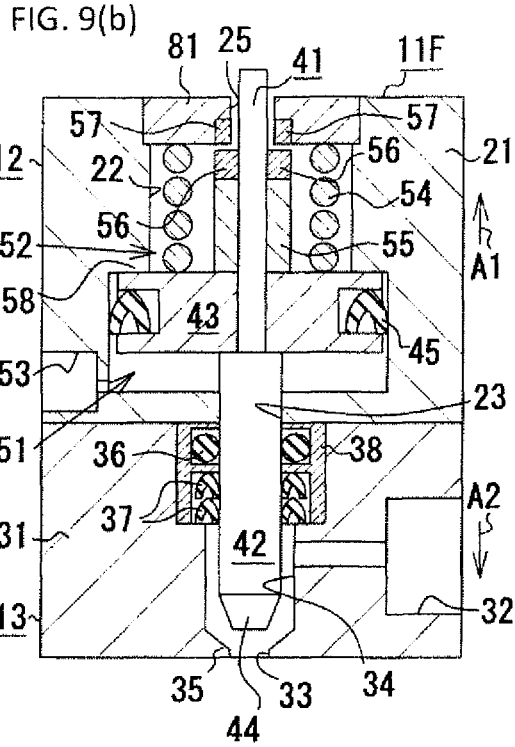
Figure 10A:
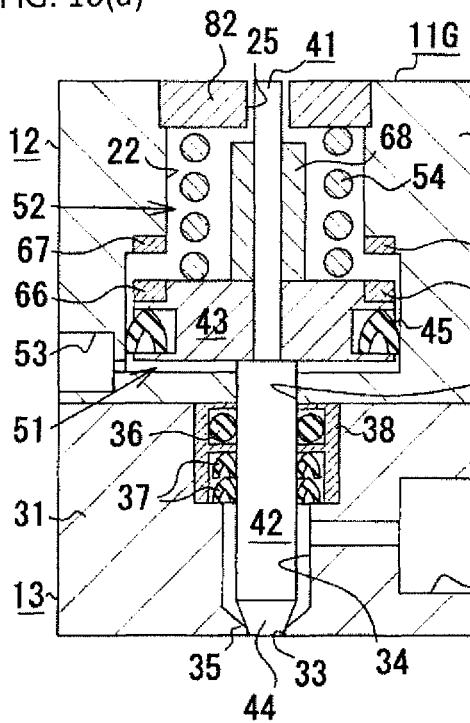
FIGS. 10(a) and 10(b) show the schematic drawings of the valve device as yet another embodiment of this invention, showing the longitudinal sectional view of such a valve device.
Figure 10B:
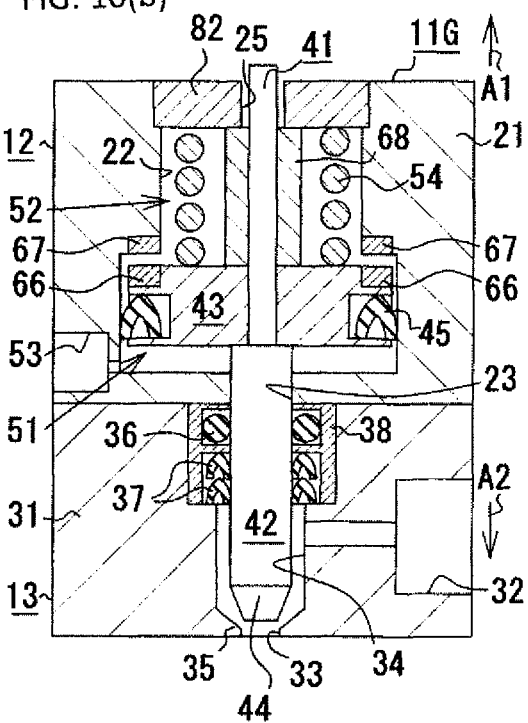
Figure 11A:
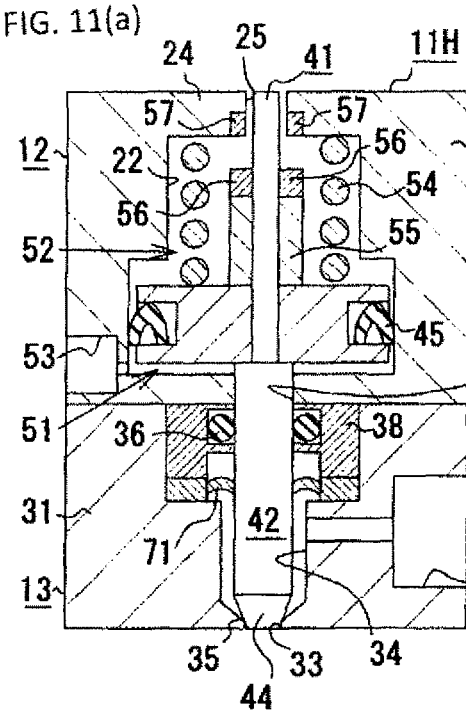
FIGS. 11(a) and 11(b) show the schematic drawings of the valve device as yet another embodiment of this invention, showing the longitudinal sectional view of such a valve device.
Figure 11B:
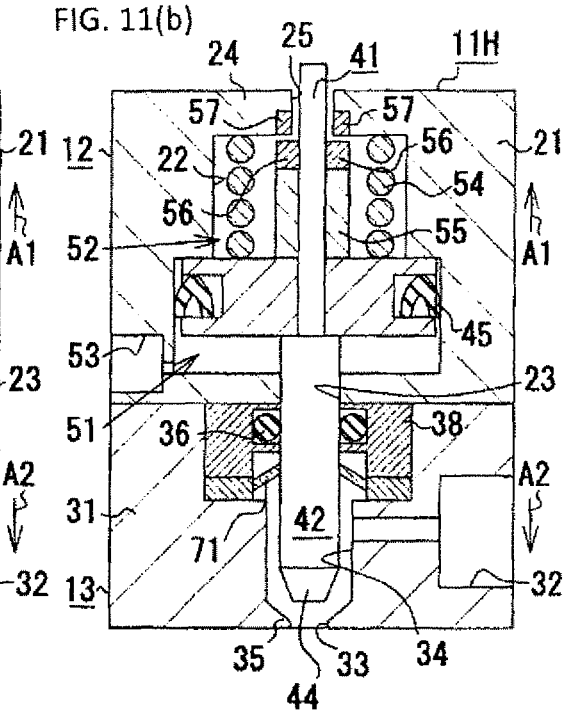
Figure 12:
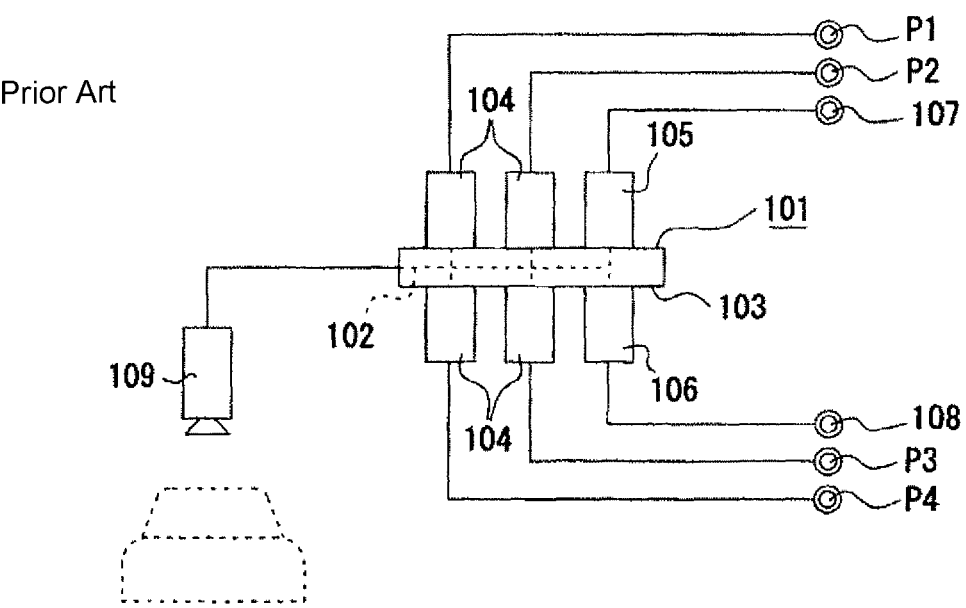
FIG. 12 is the schematic drawing explaining the structure of the color-change device using the valve device.
Figure 13:
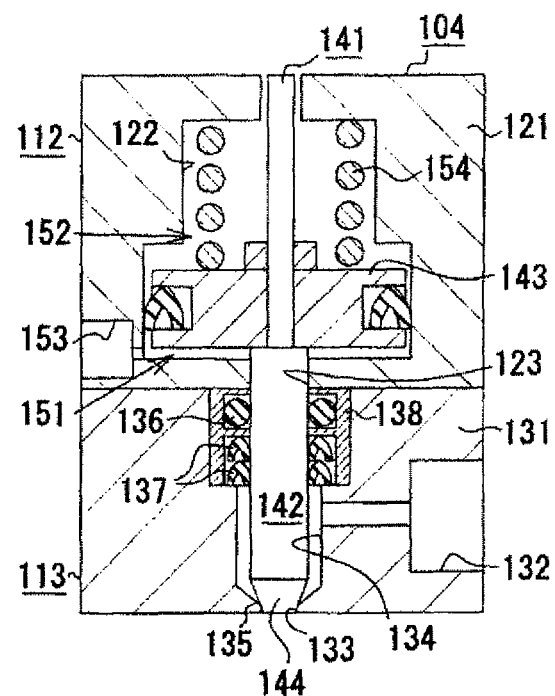
FIG. 13 is the schematic drawing of the conventional valve device, showing the longitudinal sectional view of such a valve device.

As another embodiment of the color-change valve 11F, as shown in FIG. 9, for example, it is possible to cover the piston-housing space 22 with a non-magnetic disk-shaped lid member 81, so as to attach the second permanent magnet 57 to the lid member 81. Furthermore, it is possible, as well as the color-change valve 11G, as shown in FIG. 10, to cover the piston-housing space 22 with a non-magnetic disk-shaped lid member 82. In other words, the ceiling part of the piston housing 21 is not necessarily to be integrally structured with the piston housing 21, but possible to be structured separately.

The first embodiment, as described above, prevents paint, cleaning liquid or the like from leaking into the piston-housing space 22 through the communication space by using a seal 37 at the lower side of the support assembly 38. However, it is also possible to provide a diaphragm 71, instead.

The coil spring 54 is used for each embodiment, as described above. However, it is also possible to use a spring of a shape other than the coil spring 54, as well as using another biasing means other than a spring.

About each embodiment, as described above, the first permanent magnet 56, 66 and the second permanent magnet 57, 67 are all ring-shaped. However, they are not limited to being that shape; it is possible to use a magnet of any shape.

About each embodiment, as described above, the biasing force of the biasing means works in the direction to close the valve, and the pilot-air pressure and the magnetic attraction of the permanent magnets work in the direction to open the valve. However, it is not limited to such a structure. In other words, it is possible to have a structure such that the biasing force of the biasing means works in the direction to open the valve, and the pilot-air pressure and the magnetic attraction of the permanent magnets work in the direction to close the valve.

About the fifth embodiment, as described above, the first permanent magnet 56 is provided on the valve rod 41 that is the mobile body, and the second magnetic member (lid member 70), which is not a permanent magnet, is provided in the piston housing 21 that is the fixed body. However, it is possible to reverse such a structure. That is, it is possible to provide a non-magnetic first-magnetic member on the valve rod 41 and to provide a non-magnetic second-permanent magnet 57 on the piston housing 21.

About each embodiment, as described above, the proximity-fixing member is separated from the rod part 42 and from the piston part 43 or from the piston housing 21. However, it is also possible to be integrally structured with the rod part 42, with the piston part 43 or with the piston housing 21. The stopper member can also be integrally structured with the rod part 42 and with the piston part 43 or with the piston housing 21.

About each embodiment, as described above, the valve device of this invention is used as the color-change valve 11 to 11H, so as to make the color-change device CV1, CV2 for the coating machine. However, it is not limited to that; it is possible to use such valve device for another purpose.

Besides the technical ideas of this invention, as described above, other technical ideas to be understood are described hereinafter.

(1) A valve device according to any of the first to sixth aspects of this invention, characterized in that the biasing force of the biasing means works in the direction to close the valve. Contrarily, the pilot air pressure and the magnetic attraction work in the direction to open the valve.

(2) A valve device according to any of the first to sixth aspects of this invention, characterized in that the valve components, except for the first magnetic member and the second magnetic member, are non-magnetic members.

DESCRIPTION OF THE REFERENCE NUMERALS 11, 11A, 11B, 11C, 11D, 11E, 11F, 11G and 11H: Color-change valve as the valve device
21: Housing (for the piston)
22: Piston-housing space
35: Valve seat
41: Valve rod
43: Piston part
51: First chamber
52: Second chamber
53: Pilot port
56, 66: First permanent magnet as the first magnetic member
57, 67: Second permanent magnet as the second magnetic member
70: Magnetic-lid member as the second magnetic member
55, 59: Sleeve as the adjacent-securing member
58: Stopper step
68: Stopper member
A1: First direction
A2: Second direction

The invention claimed is:

1. A valve device comprising:
a housing having a piston-housing space;
a valve rod of which a piston part is provided at a position within the piston-housing space and a valve part is formed at a tip protruding outside the piston-housing space;
a pilot port that is provided on a first chamber of first and second chambers that are dividedly formed on the piston part within the housing, the pilot port opening on a side of the housing and communicating with an inside and an outside of the housing, so as to supply pilot air, thus activating the piston part in a first direction, along an axial line of the valve rod; and
a biasing means, which is provided on the second chamber of the housing, to bias the piston part in a second direction that is an opposite direction of the first direction, so that the valve part makes contact with or separates from a valve seat by supplying or discharging the pilot air, thus controlling opening and closing of a valve,
characterized in that the valve comprises a first ring-shaped magnetic member having a first-end surface and being provided on a valve-rod side and a second ring-shaped magnetic member having a second-end surface that faces the first ring-shaped magnetic member and being provided on a housing side, wherein either of the first or second ring-shaped magnetic member is a permanent magnet, so that a magnetic attraction is generated between both of the first and second ring-shaped magnetic members to activate the piston part in the first direction, thus increasing the magnetic attraction by an approach of the first and second ring-shaped magnetic members, therein an arrangement-relation facing each of the first and second ring-shaped magnetic members through an air gap is set even when making a closest approach, and a biasing force of the biasing means works in the direction to close the valve, while pressure of the pilot-air and the magnetic attraction between the first and second ring-shaped magnetic members work in the direction to open the valve, and wherein the first ring-shaped magnetic member and the second ring-shaped magnetic member are respective first and second permanent magnets, and that the piston part has a place where the first permanent magnet as the first ring-shaped magnetic member does not exist, and a stopper-step is provided within the housing side to avoid a collision of both the first and second permanent magnets in making contact at the place where the first permanent magnet as the first ring-shaped magnetic member does not exist.

2. A valve device according to claim 1, characterized in that the magnetic attraction that works on the piston part while the pilot air is not supplied is less than the biasing force of the bias means, and that a total amount of a pressing force of the magnetic attraction and of the pilot air that work on the piston part while the pilot air is being supplied is greater than the biasing force of the bias means.

3. A valve device according to claim 1, wherein a proximity-fixing member, to hold firmly the first permanent magnet as the first ring-shaped magnetic member, is provided on the valve rod side in a state being close to the second permanent magnet as the second ring-shaped magnetic member.

4. A valve device according to claim 1, wherein a proximity-fixing member, to hold firmly the second permanent magnet as the second ring-shaped magnetic member, is provided on the housing side in a state being close to the first permanent magnet as the first ring-shaped magnetic member.

5. A valve device comprising:
a housing having a piston-housing space;
a valve rod of which a piston part is provided at a position within the piston-housing space and a valve part is formed at a tip protruding outside the piston-housing space;
a pilot port that is provided on a first chamber of first and second chambers that are dividedly formed on the piston part within the housing, the pilot port opening on a side of the housing and communicating with an inside and an outside of the housing, so as to supply pilot air, thus activating the piston part in a first direction, along an axial line of the valve rod; and
a biasing means, which is provided on the second chamber of the housing, to bias the piston part in a second direction that is an opposite direction of the first direction, so that the valve part makes contact with or separates from a valve seat by supplying or discharging the pilot air, thus controlling opening and closing of a valve,
characterized in that the valve comprises a first ring-shaped magnetic member having a first-end surface and being provided on a valve-rod side and a second ring-shaped magnetic member having a second-end surface that faces the first ring-shaped magnetic member and being provided on a housing side, wherein either of the first or second ring-shaped magnetic member is a permanent magnet, so that a magnetic attraction is generated between both of the first and second ring-shaped magnetic members to activate the piston part in the first direction, thus increasing the magnetic attraction by an approach of the first and second ring-shaped magnetic members, therein an arrangement-relation facing each of the first and second ring-shaped magnetic members through an air gap is set even when making a closest approach, and a biasing force of the biasing means works in the direction to close the valve, while pressure of the pilot-air and the magnetic attraction between the first and second ring-shaped magnetic members work in the direction to open the valve, and wherein the ring-shaped magnetic member and the second ring-shaped magnetic member are respective first and second permanent magnets, and a stopper member is provided on the valve rod within the housing to avoid the collision of both the first and second permanent magnets in making contact at the place where the second permanent magnet as the second ring-shaped magnetic member does not exist.

6. A valve device according to claim 5, characterized in that the magnetic attraction that works on the piston part while the pilot air is not supplied is less than the biasing force of the bias means, and that a total amount of a pressing force of the magnetic attraction and of the pilot air that work on the piston part while the pilot air is being supplied is greater than the biasing force of the bias means.

7. A valve device according to claim 5, wherein a proximity-fixing member, to hold firmly the first permanent magnet as the first ring-shaped magnetic member, is provided on the valve rod side in a state being close to the second permanent magnet as the second ring-shaped magnetic member.

8. A valve device according to claim 5, wherein a proximity-fixing member, to hold firmly the second permanent magnet as the second ring-shaped magnetic member, is provided on the housing side in a state being close to the first permanent magnet as the first ring-shaped magnetic member.

9. A valve device comprising:
a housing having a piston-housing space;
a valve rod of which a piston part is provided at a position within the piston-housing space and a valve part is formed at a tip protruding outside the piston-housing space;
a pilot port that is provided on a first chamber of first and second chambers that are dividedly formed on the piston part within the housing, the pilot port opening on a side of the housing and communicating with an inside and an outside of the housing, so as to supply pilot air, thus activating the piston part in a first direction, along an axial line of the valve rod; and
a biasing means, which is provided on the second chamber of the housing, to bias the piston part in a second direction that is an opposite direction of the first direction, so that the valve part makes contact with or separates from a valve seat by supplying or discharging the pilot air, thus controlling opening and closing of a valve,
characterized in that the valve comprises a first ring-shaped magnetic member having a first-end surface and being provided on a valve-rod side and a second ring-shaped magnetic member having a second-end surface that faces the first ring-shaped magnetic member and being provided on a housing side, wherein either of the first or second ring-shaped magnetic member is a permanent magnet, so that a magnetic attraction is generated between both of the first and second ring-shaped magnetic members to activate the piston part in the first direction, thus increasing the magnetic attraction by an approach of the first and second ring-shaped magnetic members, therein an arrangement-relation facing each of the first and second ring-shaped magnetic members through an air gap is set even when making a closest approach, and a biasing force of the biasing means works in the direction to close the valve, while pressure of the pilot-air and the magnetic attraction between the first and second ring-shaped magnetic members work in the direction to open the valve, and wherein the ring-shaped magnetic member and the second ring-shaped magnetic member are respective first and second permanent magnets, and a stopper is provided within the housing, the stopper providing the arrangement-relation to create the air gap and avoid collision of both the first and second permanent magnets.

10. A valve device according to claim 9, characterized in that the magnetic attraction that works on the piston part while the pilot air is not supplied is less than the biasing force of the bias means, and that a total amount of a pressing force of the magnetic attraction and of the pilot air that work on the piston part while the pilot air is being supplied is greater than the biasing force of the bias means.

11. A valve device according to claim 9, wherein a proximity-fixing member, to hold firmly the first permanent magnet as the first ring-shaped magnetic member, is provided on the valve rod side in a state being close to the second permanent magnet as the second ring-shaped magnetic member.

12. A valve device according to claim 9, wherein a proximity-fixing member, to hold firmly the second permanent magnet as the second ring-shaped magnetic member, is provided on the housing side in a state being close to the first permanent magnet as the first ring-shaped magnetic member.

* * * * *